US008136490B2

(12) United States Patent
Maguire et al.

(10) Patent No.: US 8,136,490 B2
(45) Date of Patent: *Mar. 20, 2012

(54) MULTI-PISTON CAMWHEEL ENGINE

(75) Inventors: Paul R. Maguire, Harpswell, ME (US); Dion B. Linkel, Harpswell, ME (US)

(73) Assignee: Kuzwe, LLC, Harpswell, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,521

(22) Filed: Sep. 13, 2010

(65) Prior Publication Data

US 2010/0326381 A1 Dec. 30, 2010

Related U.S. Application Data

(63) Continuation of application No. 11/844,160, filed on Aug. 23, 2007, now Pat. No. 7,814,872.

(60) Provisional application No. 60/823,373, filed on Aug. 23, 2006, provisional application No. 60/948,672, filed on Jul. 9, 2007.

(51) Int. Cl.
*F02B 75/22* (2006.01)

(52) U.S. Cl. ..................................... 123/54.8; 123/54.3

(58) Field of Classification Search ........ 123/54.1–54.8, 123/197.1, 55.1–55.7

See application file for complete search history.

(56) References Cited

U.S. PATENT DOCUMENTS

| 793,270 | A | 6/1905 | Blomgren |
| 1,445,474 | A | 2/1923 | Benson et al. |
| 1,708,611 | A | 4/1929 | Felt |
| 1,774,087 | A | 8/1930 | Dunn |
| 2,120,657 | A | 6/1938 | Tucker |
| 2,124,604 | A | 7/1938 | Bidwell |
| 3,572,209 | A | 3/1971 | Adridge et al. |
| 3,572,297 | A | 3/1971 | Murray |
| 4,432,310 | A | 2/1984 | Waller |
| 4,492,188 | A | 1/1985 | Palmer et al. |
| 4,545,336 | A | 10/1985 | Waide |
| 4,974,553 | A | 12/1990 | Murray et al. |
| 5,479,780 | A | 1/1996 | McCabe |
| 5,606,938 | A | 3/1997 | Rowe |
| 5,634,441 | A | 6/1997 | Ragain |

(Continued)

FOREIGN PATENT DOCUMENTS

WO PCT/US07/18729 3/2008

OTHER PUBLICATIONS

Wetzler, Brad; "Jocko's Rocket—Will the car of the future come screaming out of the Mohave desert"; Outside Magazine; Aug. 1999; http://outside.away.com/outside/magazine/0899/9908jocko.html.

(Continued)

*Primary Examiner* — Noah Kamen
(74) *Attorney, Agent, or Firm* — Scott T. Griggs; Griggs Bergen LLP

(57) ABSTRACT

An engine is disclosed. In one implementation, the engine includes a camwheel mounted to an output shaft. Eighteen cylinder-enclosed pistons are positioned in a circular plane about the camwheel such that the radius of the circular plane and the camwheel are coplanar. Lobes integrally formed on the camwheel define a guiderail including a continuously, substantially sinusoidal surface biased for rotation in the direction of the rotary motion of the output shaft. Drive bearings associated with each piston engage and maintain contact with the guiderail. The rotary motion is obtained by transferring the displacement of the plurality of pistons from respective top dead center positions and bottom dead center positions to the guiderail, thereby rotating the camwheel and output shaft.

20 Claims, 9 Drawing Sheets

U.S. PATENT DOCUMENTS

| | | | |
|---|---|---|---|
| 5,765,512 | A | 6/1998 | Fraser |
| 5,992,356 | A | 11/1999 | Howell-Smith |
| 6,155,214 | A | 12/2000 | Manthey |
| 6,205,972 | B1 | 3/2001 | Di Stefano |
| 6,412,454 | B1 | 7/2002 | Green |
| 7,219,631 | B1 | 5/2007 | O'Neill |

OTHER PUBLICATIONS

Hastor, Henry: Jocko Johnson: One Step Beyond; American Hot Rod Foundation, The—News; Apr. 1, 2005; http://www.ahraf.com/news.php?ip=10038.

Axial Vector Engine Corporation Website; "The Axial Vector Engine"; http://www.axialvectorengine.com.

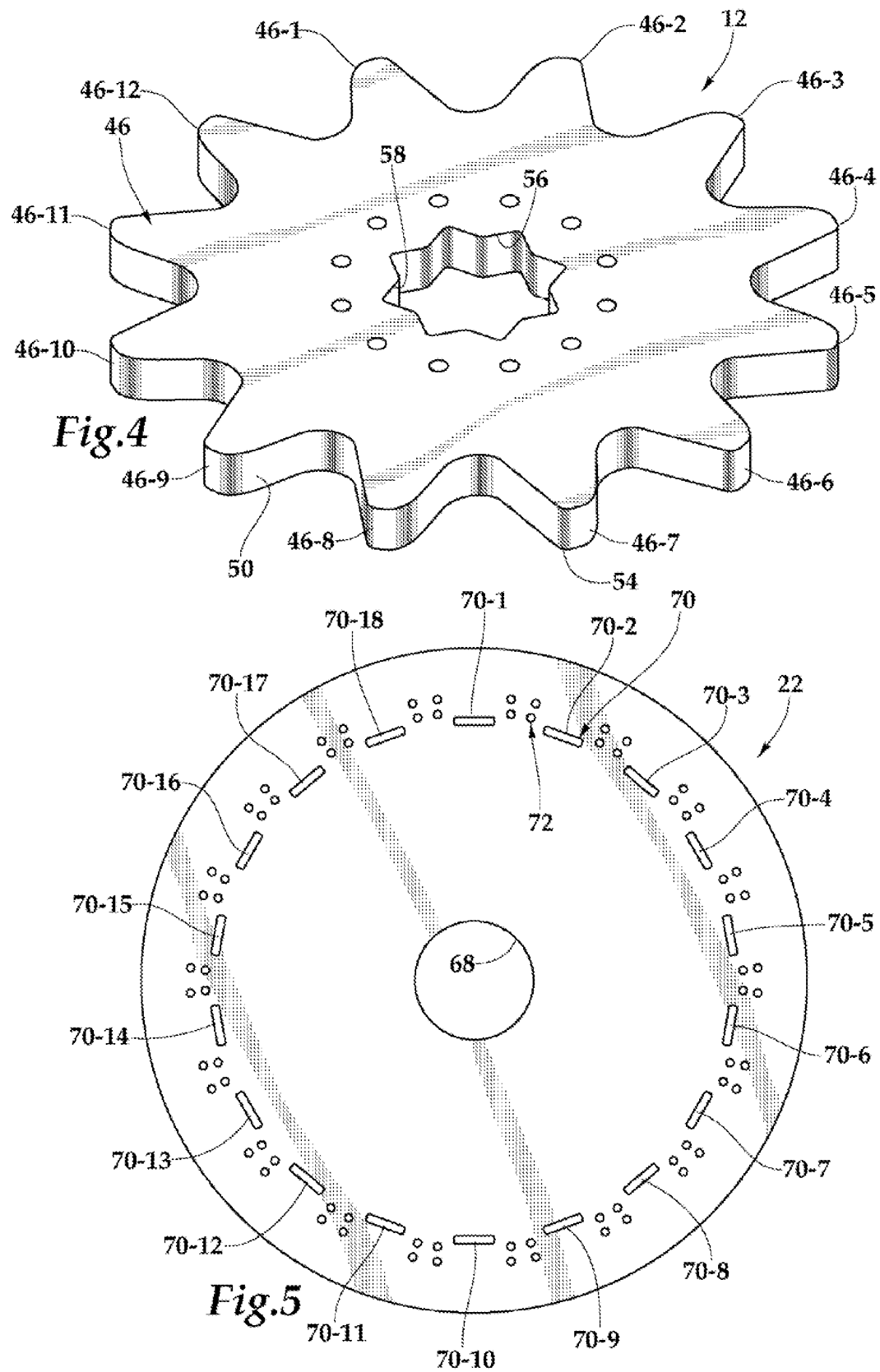

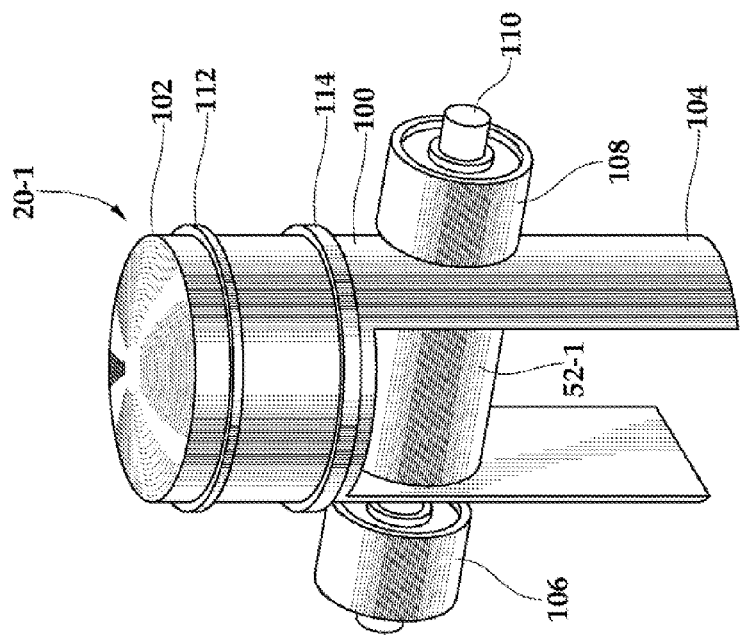
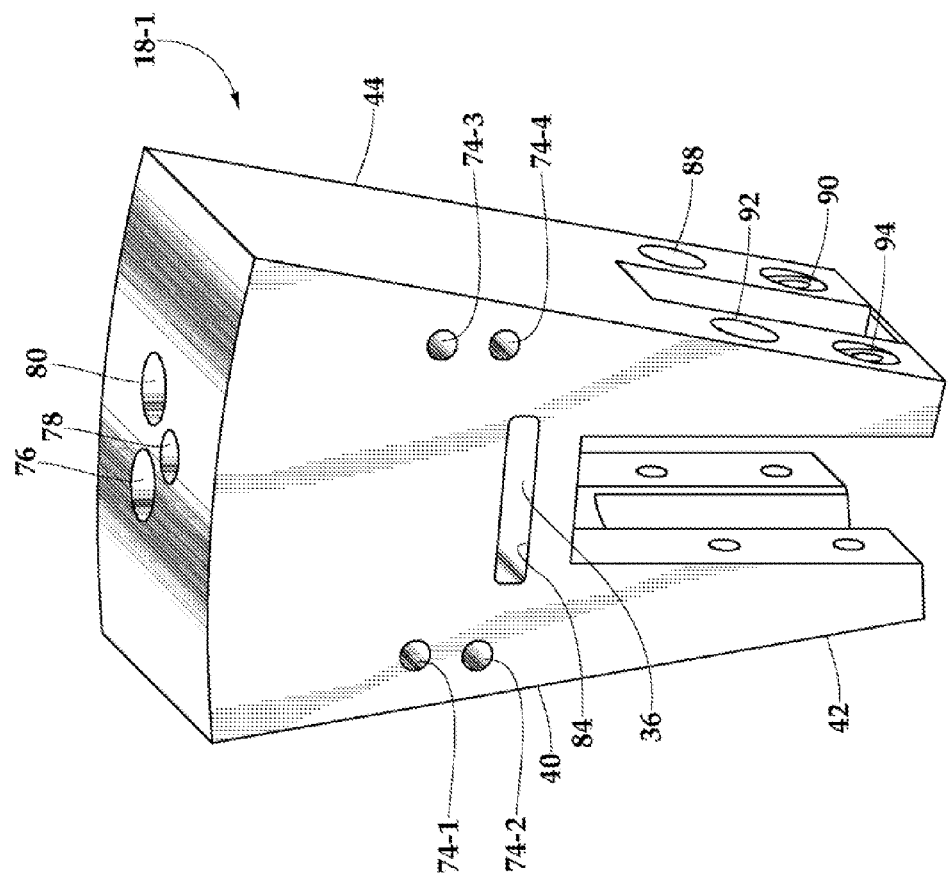

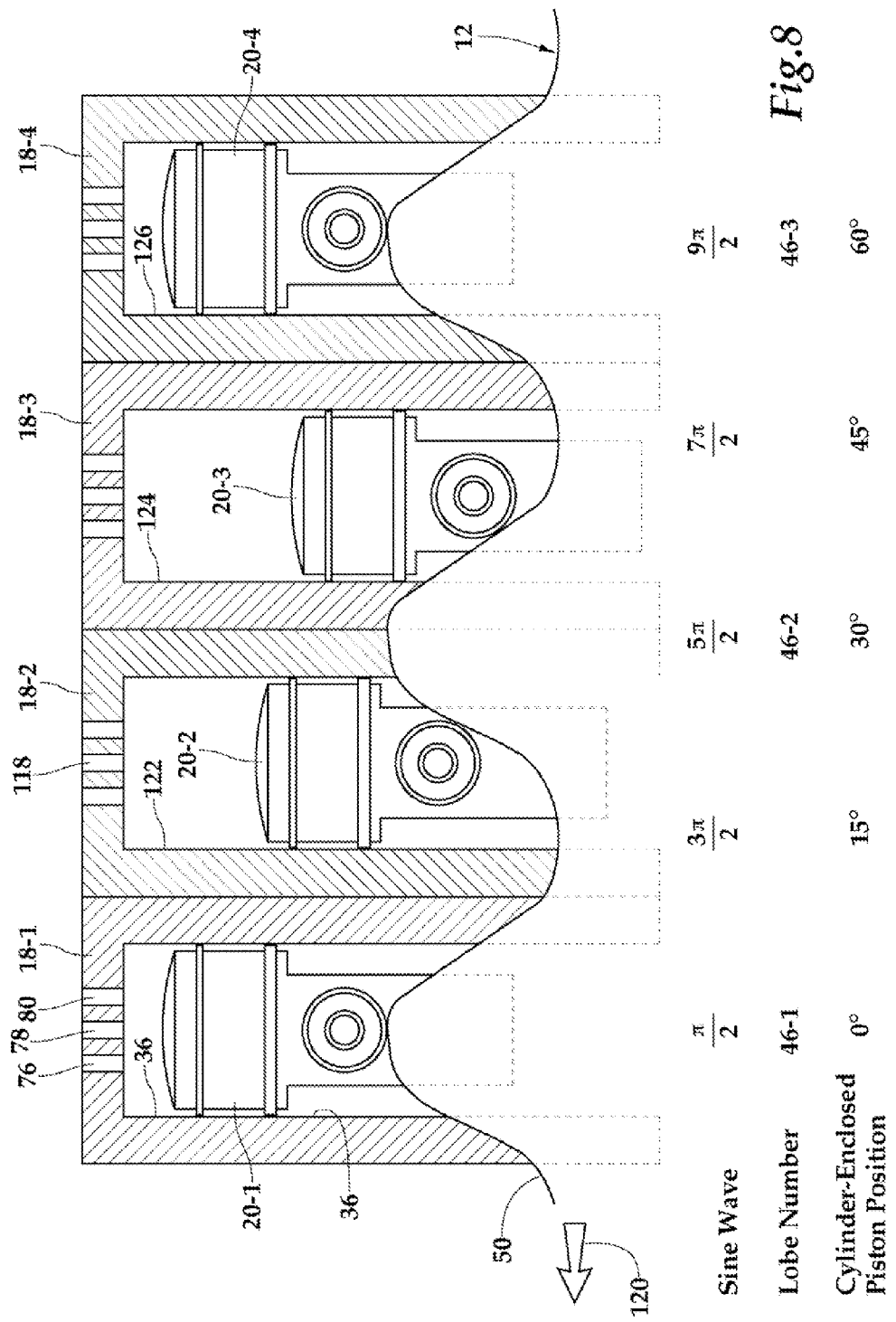

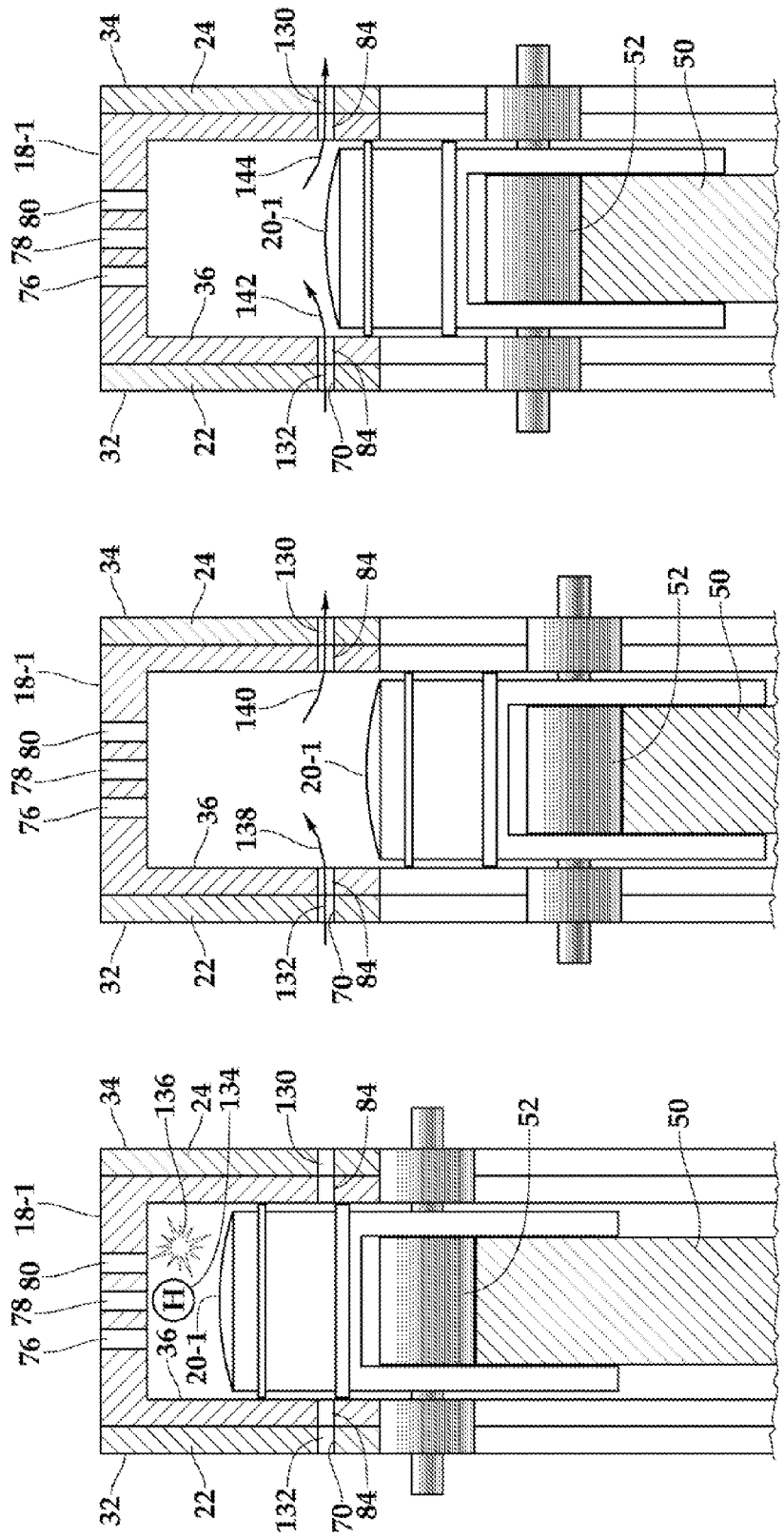

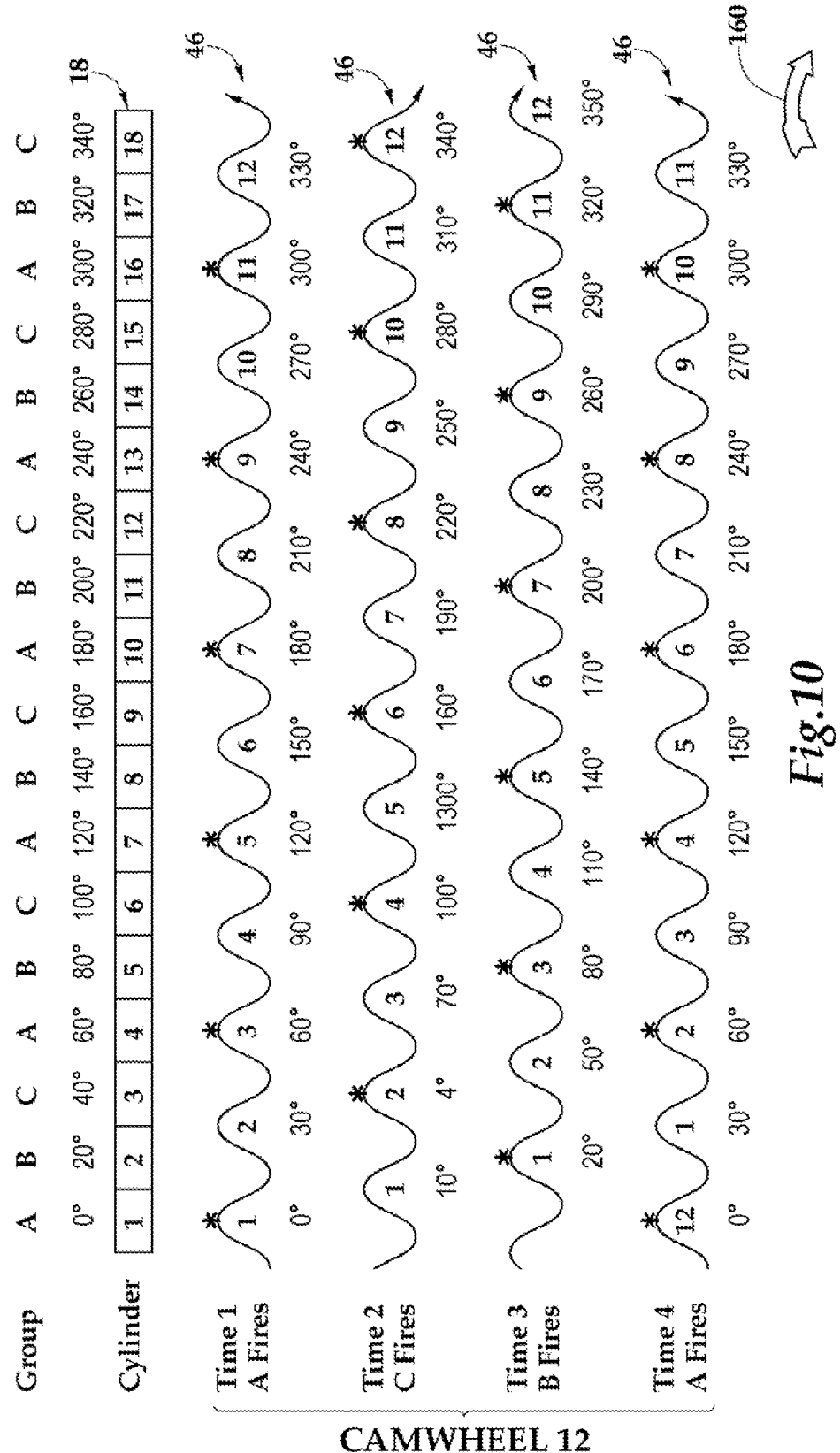

MULTI-PISTON CAMWHEEL ENGINE

PRIORITY STATEMENT & CROSS-REFERENCE TO RELATED APPLICATIONS

This application is a continuation of U.S. patent application Ser. No. 11/844,160, entitled "Multi-Piston Camwheel Engine" and filed on Aug. 23, 2007, in the name of Maguire et al., which issued on Oct. 19, 2010 as U.S. Pat. No. 7,814,872; which claims priority from the following applications: (1) U.S. Patent Application Ser. No. 60/823,373, entitled "Engine" and filed on Aug. 23, 2006, in the names of Maguire et al.; and (2) U.S. Application Ser. No. 60/948,672, entitled "Engine" and filed on Jul. 9, 2007 in the names of Maguire et al.; all of which are hereby incorporated by reference for all purposes.

TECHNICAL FIELD OF THE INVENTION

This invention relates, in general, to engines and, in particular, to internal combustion engines that convert combustion energy into rotational energy without the use of a traditional crankshaft.

BACKGROUND OF THE INVENTION

Traditional engines operate by transforming the displaced motion of a piston into rotary motion of a shaft by utilizing a system of connecting rods and a crank shaft. The problems related to this design include discrete efficiency, low fuel economy, and fallible reliability brought about by inherent design limitations; namely, consequential problems caused by the inertia of the connecting rods, the adequate balancing of the crank shaft, along with the relative arrangement of their associated supports, and finally, by the placement of the valves and camshaft. As the development of new designs has remained stagnant for some time, innovative alternative solutions are needed that address the deficiencies of traditional engine designs.

SUMMARY OF THE INVENTION

An engine and method for use of the same are disclosed. In one implementation, the engine includes a camwheel mounted to an output shaft to convert combustion energy into rotational energy without the use of a traditional crankshaft and associated connecting rods. Eighteen cylinder-enclosed pistons are positioned in a circular plane about the camwheel such that the radius of the circular plane and the camwheel are coplanar. Lobes integrally formed on the camwheel define a guiderail including a continuously, substantially sinusoidal surface biased for rotation in the direction of the rotary motion of the output shaft. Drive bearings associated with each piston engage and maintain contact with the guiderail. The rotary motion is obtained by transferring the displacement of the plurality of pistons from respective top dead center positions and bottom dead center positions to the guiderail, thereby rotating the camwheel and the output shaft.

Accordingly, the engine design presented herein includes reciprocating pistons in a radial design that operate without connecting rods or a crankshaft. The problems related to the traditional engine design including discrete efficiency, low fuel economy, and fallible reliability brought about by inherent design limitations are therefore reduced or eliminated. Further, a rotary engine of the type presented herein offers particular advantages over the traditional engine. By way of example, the reciprocating movement of the piston occurs on a line parallel to the axis of rotation of the output shaft. Accordingly, the piston is not acting against centrifugal force resulting from the rotational output of the engine. The arrangement of cylinders on axes parallel to the rotation of the output shaft results in a very compact engine for a given total displacement, which is enhanced moreover by the absence of crankshafts and associated parts found in a traditional engine. Appreciable weight savings are made as well with respect to the minimum parts required.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4 is a front plan view of one embodiment of the camwheel presented in FIG. 3;

FIG. 5 is a front plan view of one embodiment of a mounting plate;

FIG. 6 is front perspective view of one embodiment of a cylinder;

FIG. 7 is a front perspective view of one embodiment of a piston;

FIG. 8 is a front cross-sectional view of one embodiment of cylinder-enclosed pistons in contact with the camwheel;

FIG. 9A is a lateral cross-sectional view of one embodiment of one cylinder-enclosed piston in contact with the camwheel at a top dead center (TDC) position;

FIG. 9B is also a lateral cross-sectional view of one embodiment of one cylinder-enclosed piston in contact with the camwheel at a bottom dead center (BDC) position;

FIG. 9C is a further lateral cross-sectional view of one embodiment of one cylinder-enclosed piston in contact with the camwheel at an intermediate position;

FIG. 10 is a timing diagram illustrating one embodiment of the position of the camwheel in a three movement phase cycle with respect to the cylinder block.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
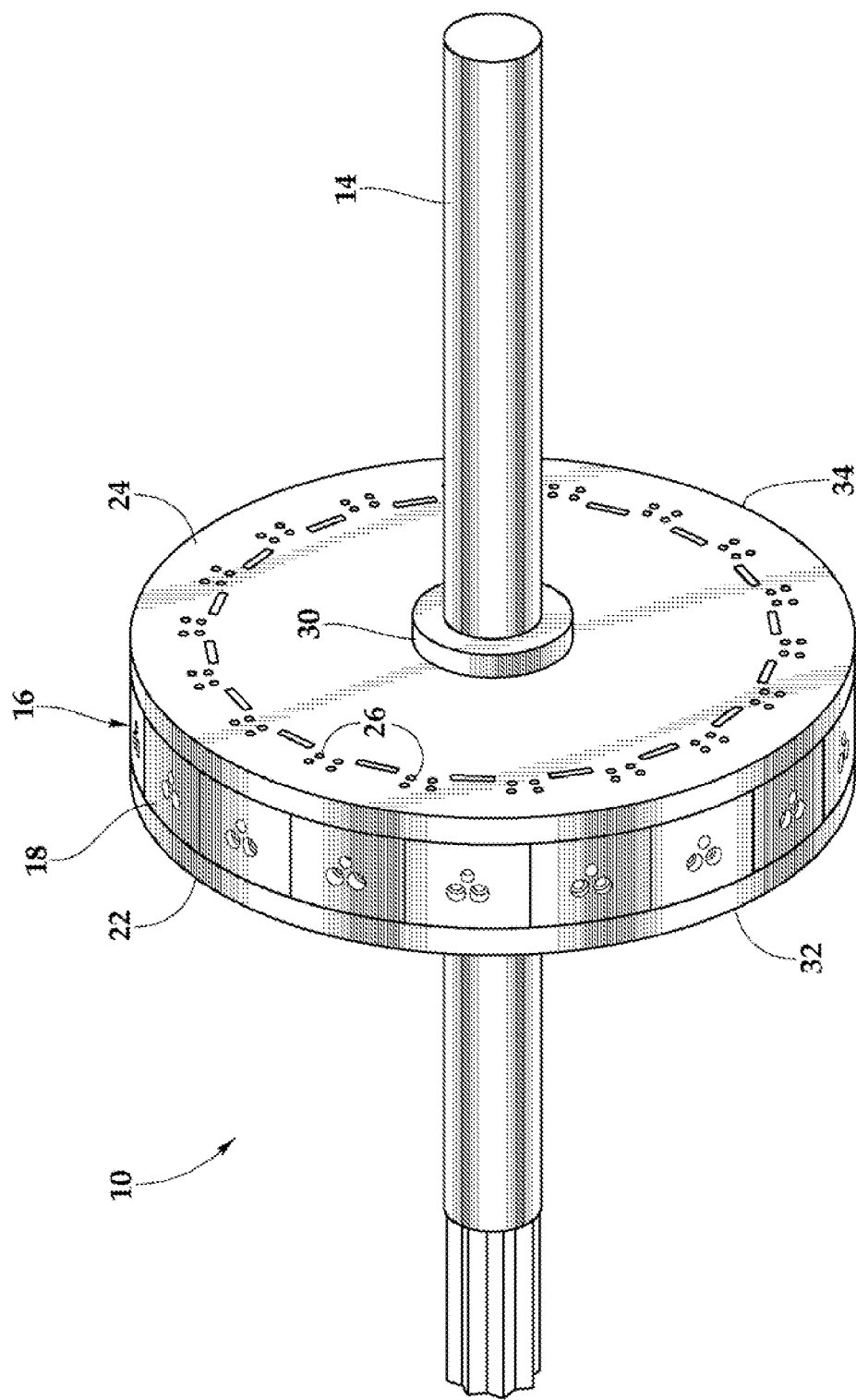
FIG. 1 is a front perspective view of one embodiment of the engine.
Figure 2:
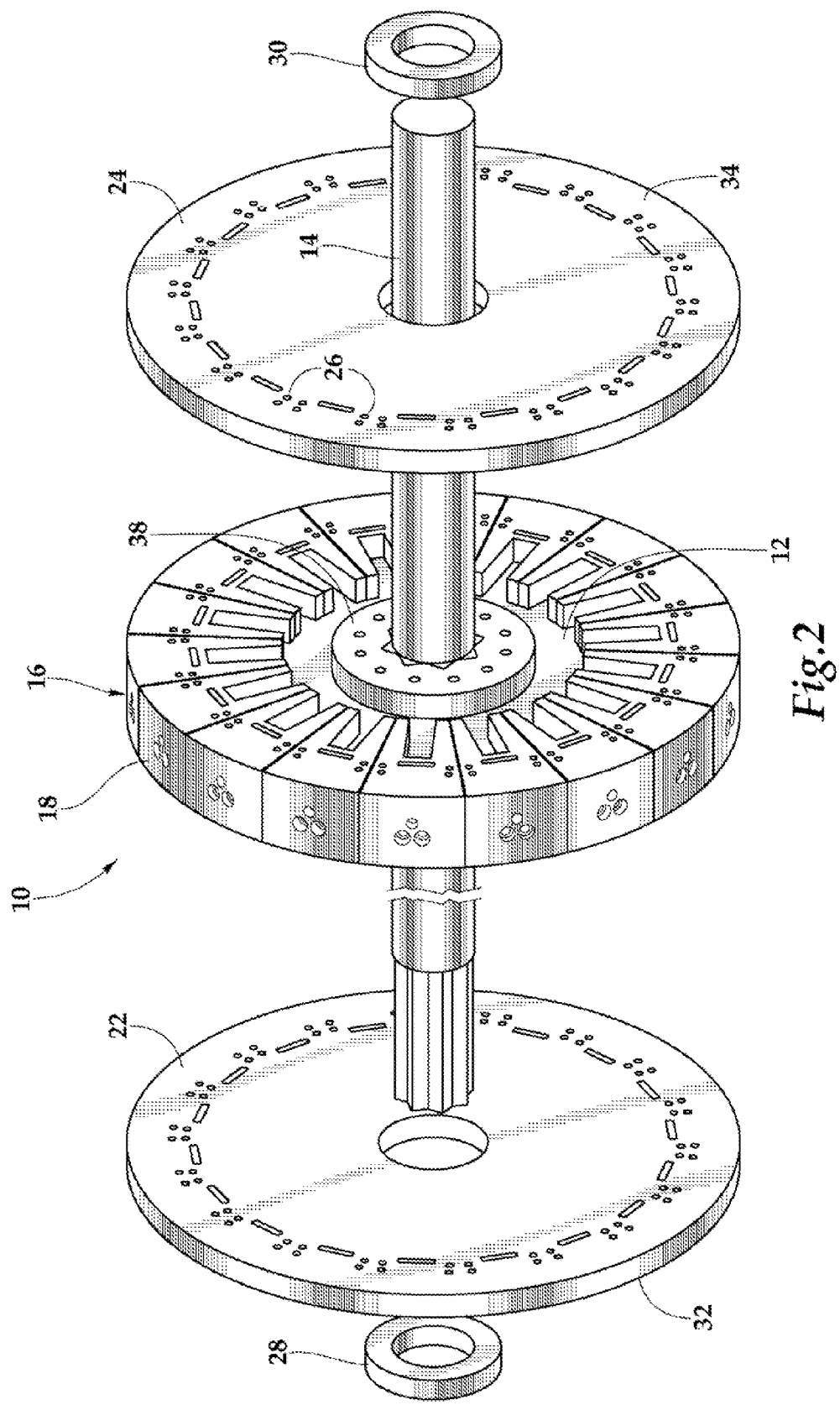
FIG. 2 is a lateral perspective exploded view of the engine presented in FIG. 1.
Figure 3:
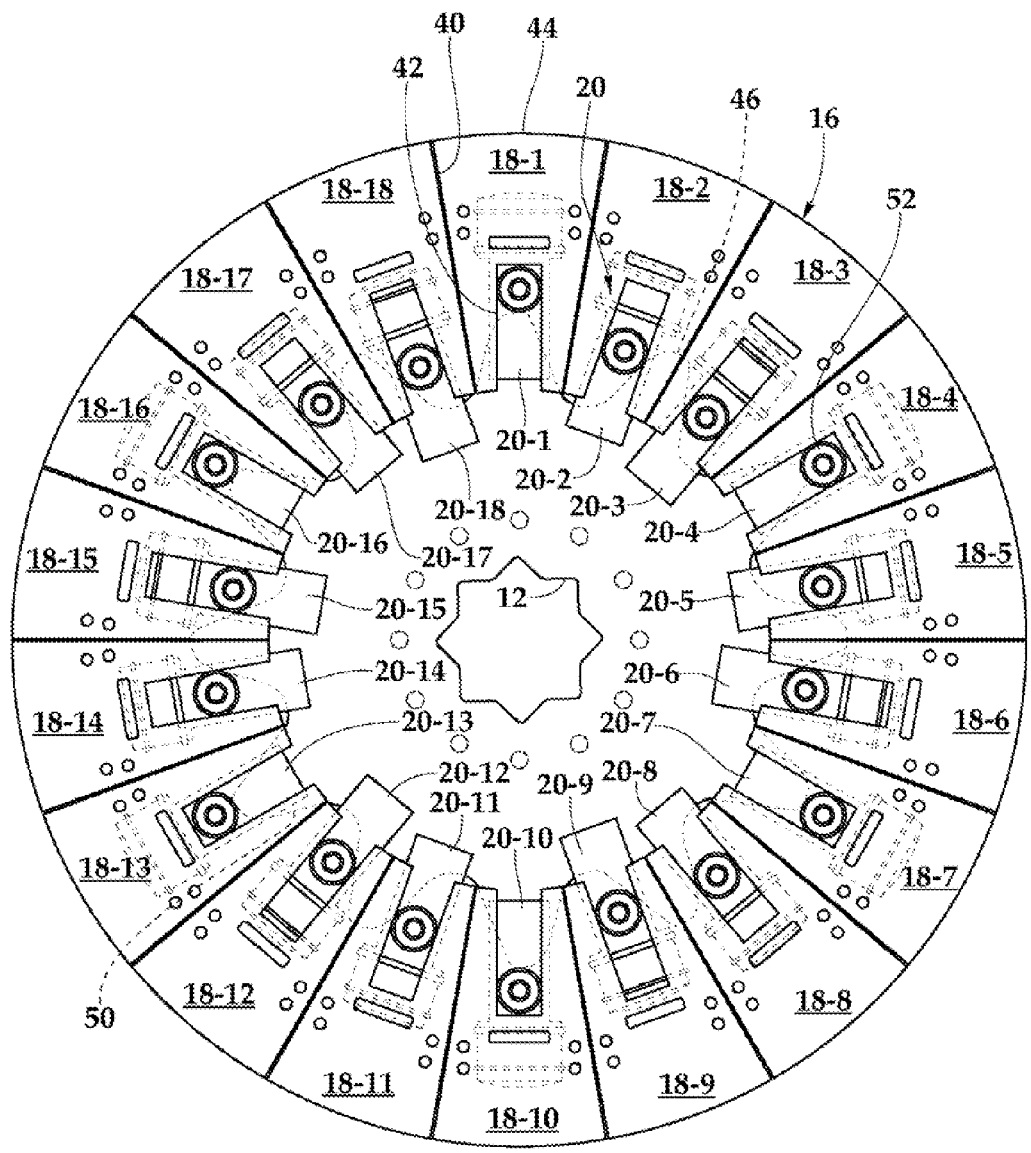
FIG. 3 is a front plan view of one embodiment of a cylinder block mounted to a camwheel.

Referring initially to FIGS. 1, 2, and 3, therein one embodiment of an engine is depicted that is schematically illustrated and generally designated 10. A camwheel 12 is rotatably mounted to an output shaft 14, which may in turn be connected to any type of load. A cylinder block 16 including 18 cylinders, 18-1 through 18-18, which are collectively referenced by the number 18, is concentrically disposed about the camwheel 12. Eighteen pistons 20-1 through 20-18, which are collective cylinder-enclosed pistons 20, are respectively disposed within the eighteen cylinders 18-1 through 18-18. As will be discussed in more detail hereinbelow, each of the pistons 20 includes a drive bearing for engaging and maintaining contact with the camwheel 12. Each of the pistons 20 reciprocates within its static cylinder, the reciprocation and displacement of the piston being determined by the position of the camwheel 12 as discussed hereinbelow.

The cylinder block 16 is securely interposed between mounting plates 22, 24, which may be referred to as the first mounting plate and the second mounting plate, respectively, in a static circular plane about the camwheel 12 such that a radius of the circular plane and the camwheel 12 are coplanar. As illustrated, the mounting plate 22 faces an intake side 32 of the engine 10 and the mounting plate 24 faces an exhaust side 34. The cylinder block 16 is held in place between the mounting plates 22, 24 by 72 fasteners, which are generally referred to by the number 26. Four fasteners for each of the 18 cylinders, extend through the mounting plate 22, a respective cylinder, such as cylinder 18-1, and the second mounting plate 24. Mounting members 28, 30 are respectively distally disposed against the mounting plates 22, 24. Further, a spacing plate 38, along with a corresponding spacing plate (which is not illustrated) on the intake side 32, may be utilized to create a flush surface with the cylinder block 16 for contact with mounting plate 24.

Referring now to FIG. 3, the design of the eighteen cylinders 18-1 through 18-18 permit the cylinders 18 to straddle the camwheel. More specifically, cylinder 18-1 includes a substantially wedge shape body 40 that forms a skirt 42 opposite to a head 44 of the cylinder 18-1. The skirt 42 receives the camwheel 12 and extends about the camwheel 12 in a line radial to an axis of rotation of the output shaft 14. It should be appreciated that the other 17 cylinders, cylinders 18-2 through 18-18, are of a like design, and combined form the concentric cylinder block 16 with respect to the output shaft 14.

Twelve lobes 46-1 through 46-12 (see FIG. 4), which are collective referred to as lobes 46, are integrally formed on a body 48 of the camwheel 12 to define a guiderail 50. The pistons 20-1 through 20-18, having respective drive bearings, which are collectively referred to as drive bearings 52, are slidably seated within the respective cylinders 18-1 through 18-18. In particular, the drive bearings 52 engage and maintain contact with the guiderail 50 such that the slope and/or curve of the guiderail 50 vertically displaces the pistons 20 within the cylinders.

FIG. 4 depicts one embodiment of the camwheel 12. As previously discussed, twelve lobes 46-1 through 46-12 are integrally formed on the body 48 of the camwheel 12. The lobes 46 define the guiderail 50 that includes a continuously, substantially sinusoidal surface 54. In one implementation, the substantially sinusoidal surface 54 is biased for rotation in the direction of the rotary motion of the output shaft 14 in order to encourage the concurrent rotation of the camwheel 12. A mounting passageway 56 formed within the body 48 is adapted to accept the output shaft 14 therethrough. The illustrated star shape 58 of the mounting passageway 56 increases the frictional connection between the camwheel 12 and the mounting shaft 14. Although a star shape is illustrated, it should be appreciated that other shapes and dimensions are applicable to the mounting passageway 56.

FIG. 5 depicts one embodiment of the mounting plate 22. Eighteen fluid passageways 70-1 through 70-18, collectively fluid passageways 70, traverse the mounting plate 22 to provide for the flow of fluid gases therethrough. In particular, the fluid passageways 70 facilitate the exchange of gases through the engine 10 as well as the collection of heat from the interior of the engine 10 and the associated expulsion thereof. Seventy-two bores, which are designated by the number 72, receive the corresponding 72 fasteners, which may be bolts or other fasteners, for securing the cylinder block 16 in position between the mounting plates 22, 24. It should be appreciated that the mounting plate 24 may be of a substantially similar design or a different design from the mounting plate 22. By way of example, the mounting plate 24 may include additional mounting surface extending from opposite ends near fluid passageways 70-1 and 70-10.

FIG. 6 depicts one embodiment of the cylinder 18-1. Four bores 74-1 through 74-4 extend through the cylinder 18-1 for receiving four fasteners 26. Ports 76, 78, 80, which may be referred to as first, second, and third ports, are disposed in a head 44 of the cylinder 18-1 and are aligned substantially normal to the output shaft 14. The ports 76, 78, 80 respectively accept pressurized air, a fuel injector, and an igniter, which may be a glow plug, spark plug, or the like. It should be appreciated, however, that the number and design of the ports may vary depending on the application of the engine 10.

A fluid passageway 84 is in fluid contact with a chamber 36 in the interior of the cylinder 18-1 and traverses the cylinder 18-1 to provide for heat exchange and to assist with the implementation of scavenging. The passageway 84, when not obstructed by the reciprocating piston 20-1, pushes exhausted combustible mixture, which is "charged out", out of the cylinder 18-1 and draws in a fresh draught of air, for example, to be ready for the next cycle. Apertures 88, 90, 92, 94 provide for the use of hardened inserts, which may be utilized to strengthen a connection between cylinders 18. As previously discussed, the substantially wedge shape body 40 forms a skirt 42 opposite to the head 44 for accepting and straddling the camwheel 12. It should be appreciated that the other 17 cylinders, cylinders 18-2 through 18-18, have substantially identical designs and construction.

FIG. 7 depicts one embodiment of the piston 20-1 that corresponds to the cylinder 18-1. A connecting shaft 100 couples the drive bearing 52-1 to a crown 102 of the piston 20-1. In one implementation, the drive bearings 52 utilized are anti-frictional to optimize the roll on the guiderail 50. More particularly, the crown 102 of the piston 20-1 is seated in the skirt 42 of the cylinder 18-1 such that the crown 102 is positioned in the chamber 36. The connecting shaft 100 forms a U-shaped free end 104 and the drive bearing 52-1 spans the U-shaped free end while engaging and maintaining contact with the guiderail 50. Opposingly mounted journals 106, 108, which may comprise tapered bearings, on shaft 110 ensure that the drive bearing 52-1 maintains its position within the U-shape free end 104. Seals 110, 112 are disposed on the crown 102 of the piston 20-1 to contain pressure above the crown 102 of the piston 20-1. It should be appreciated that the other 17 pistons, pistons 20-2 through 20-18, have substantially identical designs and construction. In one embodiment, each of the pistons 20 are of substantially the same weight. Additionally, each of the cylinders are substantially the same weight. This results in approximately equal weight cylinder-piston sets that balance the motion of each of the pistons with a corresponding reciprocating piston on the opposite side of the camwheel 12 as will be discussed further hereinbelow. Further, other modifications to the pistons are within the teachings presented. For example, three seals may be utilized on each piston with two seals near the crown and one seal positioned farther down. Additionally, it should be appreciated that the components presented in the illustrations are not necessarily drawn to scale and may be of larger or smaller size depending on the application. The materials used in the construction of the components presented herein may vary, however, the components should be suitable to the engine environment described herein.

FIG. 8 depicts one embodiment of the cylinder-enclosed pistons 20-1 through 20-4 in contact with the camwheel 12. The engine 10 provides rotary motion by transferring the displacement of the eighteen pistons 20 from respective top dead center positions and bottom dead center positions to the camwheel 12, which in turn rotates the output shaft 14. The illustrated figure presents the contributions of cylinder-enclosed pistons 20-1 through 20-4 which are applicable to the pistons 20 as a whole. The camwheel 12 is advancing counterclockwise relative to the cylinder-enclosed pistons 20 as indicated by arrow 120. Further, it should be appreciated that both the cylinder block 16 and the substantially sinusoidal surface 54 of the guiderail 50 of the camwheel 12 are presented in a more linear fashion for purposes of explanation.

The chamber 36 of cylinder 18-1 is full of a combustible mixture and, as the piston 20-1 is positioned at the peak of the lobe 46-1 or top dead center, the piston 20-1 is compressing the combustible mixture. An igniter which is in communication with the chamber 36 introduces a spark through the port 80. The subsequent combustion and ignition of the mixture pushes the piston 20-1 downward on the guiderail 50 and rotationally advances the camwheel 12. The advancement of the guiderail 50 guides the cylinder 18-1 relatively clockwise on a downward slope toward the valley between the lobes 46-1 and 46-2. Additional space between the piston 20-1 the cylinder 18-1 in the chamber 36 is thereby created which provides for the release of the combusted gases by air intake and exhaust as will be discussed in more detail in FIG. 9.

As the cylinder-enclosed piston 20-1 is firing, the cylinder 18-2 is ascending toward a top dead center position at lobe 46-2 of the camwheel 12. The cylinder 18-2 has expelled its spent combustible mixture and fresh combustible mixture fills the chamber through a port 118, which is analogous to the aforementioned port 78 and under increased pressure as the piston 20-2 rises. Cylinder 18-3 was fired in the previous firing cycle and the cylinder-enclosed piston 20-3 is approaching the bottom dead center position between lobes 46-2 and 46-3. As it begins its decent, the expulsion of combusted gases and intake of combustible mixture begins. Cylinder 18-4 is functioning analogously to cylinder 18-1. Similarly, although not show, cylinder 18-5 is functioning analogously to cylinder 18-2 and 18-6 to 18-3. The three sets of cylinder groups, Groups A, B, and C, will be discussed in further detail in FIG. 10.

FIGS. 9A through 9C depict one embodiment of the cylinder-enclosed piston 20-1 in contact with the camwheel 12 and interposed between mounting plates 22, 24. As depicted, three reciprocating positions of the cylinder-enclosed piston 20-1 are presented; namely, a top dead center position (FIG. 9A), a bottom dead center position (FIG. 9B), and a position during displacement (FIG. 9C), which is in between the top dead center position and the bottom dead center position. With reference to FIG. 9A, a chamber 36 of the cylinder 18-1 is in fluid communication with the intake side 32 of the engine 10 by way of a passageway 132, which is one of the aforementioned passageways 70, of mounting plate 22 and the fluid passageway 84 of the cylinder 18-1. Similarly, the chamber of 36 is in fluid communication with the exhaust side 34 by way of a passageway 130, which is one of the aforementioned passageways 70, and the fluid passageway 84. This alignment forms a fluid flow path 132. As will be discussed in detail hereinbelow, in certain positions the piston 18-1 obstructs or partially obstructs the fluid flow path 132 since the position of the camwheel 12 affects the displacement of the piston 18-1, which in turn affects the position of the piston 18-1 within the chamber 36 and relative to the fluid flow path 132.

At a top dead center piston position, wherein, the drive bearing 50 of piston 20-1 is contacting guiderail 52 and positioned at the peak of a lobe of the camwheel 12, the chamber 36 of the cylinder 18-1 is full of a combustible mixture and the piston 20-1 is obstructing the fluid flow path 132 placing the combustible material under pressure as represented by number 134. A spark 136 is introduced through the port 80, which is adapted for an igniter, into the chamber 36. The subsequent combustion and ignition of the mixture relatively pushes the piston 20-1 downward on the guiderail 50 and rotationally advances the camwheel 12. This movement of the piston 20-1 may be considered a working stroke.

The vertical displacement of the piston 20-1 toward the output shaft 14 creates additional internal space between the piston 20-1 the cylinder 18-1 in the chamber 36. Further, the fluid flow path 132 is unobstructed thereby providing for the intake of combustible gases and the exhaust of combusted gases. As the camwheel 12 continues to rotate, the cylinder-enclosed piston 20-1 reaches a bottom dead center position at the valley between two lobes 46 of the camwheel 12.

With reference to FIG. 9B, in this position, the exchange of gases is maximized before the piston 20-1 begins its ascension toward another peak of the camwheel 12. The maximized exchange of gases occurs from the intake side 32 of the engine 10 to the exhaust side 34 of the engine 10 as represented by intake flow 138 and exhaust flow 140 through fluid flow passageway or fluid flow path 132, which is connected to the chamber 36. This movement of the piston 20-1 may be considered an exhaust stroke.

With reference to FIG. 9C, as the piston 20-1 ascends, the during displacement position is reached wherein the combusted gases have been exchanged for combustible gases and fuel is injected through the port 78. It is about this time that a partial obstruction of the fluid flow path 132 occurs as the piston 20-1 rises toward the previously discussed top dead center position. This movement of the piston 20-1 may be considered an intake stroke and, in one implementation, each piston may be considered as having three strokes. It should be appreciated, however, that other stroke embodiments are within the teachings presented herein. For example, each piston may be considered to have an intake stroke, a compression stroke, a working stroke, and an exhaust stroke.

FIG. 10 depicts a timing diagram illustrating one embodiment of the position of the camwheel in a three movement phase cycle with respect to the cylinder block 16 which includes the cylinders 18. It should be appreciated that both the cylinders 18 and the substantially sinusoidal surface 54 of the guiderail 50 of the camwheel 12 is presented in a linear fashion for purposes of explanation. The camwheel 12 is rotating clockwise as indicated by arrow 160. As previously discussed, the 18 cylinders of the cylinder block 16 are respectively fixed. As illustrated, the position of each cylinder 18 and corresponding piston 20 about the axis of rotation of the output shaft 14 is indicated in degrees. The eighteen cylinders 18 and corresponding cylinder-enclosed pistons 20 are centered at 20° degree intervals about the axis of rotation at 0°, 20°, . . . , 320°, 340°. The cylinder-enclosed pistons include three groups, Groups A, B, and C as shown in the following table, Table I: Cylinder-enclosed Piston Grouping:

TABLE I

Cylinder-enclosed Piston Grouping

| Cylinder-Enclosed Piston | Position | Piston Group | Opposed Piston |
|---|---|---|---|
| 20-1 | 0° | A | 20-10 |
| 20-2 | 20° | B | 20-11 |
| 20-3 | 40° | C | 20-12 |
| 20-4 | 60° | A | 20-13 |
| 20-5 | 80° | B | 20-14 |
| 20-6 | 100° | C | 20-15 |
| 20-7 | 120° | A | 20-16 |
| 20-8 | 140° | B | 20-17 |
| 20-9 | 160° | C | 20-18 |
| 20-10 | 180° | A | 20-1 |
| 20-11 | 200° | B | 20-2 |
| 20-12 | 220° | C | 20-3 |
| 20-13 | 240° | A | 20-4 |
| 20-14 | 260° | B | 20-5 |
| 20-15 | 280° | C | 20-6 |
| 20-16 | 300° | A | 20-7 |
| 20-17 | 320° | B | 20-8 |
| 20-18 | 340° | C | 20-9 |

Group A comprises pistons 20-1, 20-4, 20-7, 20-10, 20-13 and 20-16 which include the opposing pairs of pistons (20-1), (20-10), (20-4), (20-13), and (20-7), (20-16), each separated by 180°. Group B comprises pistons 20-2, 20-5, 20-8, 20-11, 20-14, and 20-17 which includes the opposing pairs of pistons (20-2), (20-11), (20-5), (20-14), and (20-8), (20-17), each separated by 180°. Lastly, Group C comprises pistons 20-3, 20-6, 20-9, 20-12, 20-15, and 20-18 which includes the opposing pairs of pistons (20-3), (20-12), (20-6), (20-15), and (20-9), (20-18), each also separated by 180°. As will be discussed hereinbelow, 18 pistons fire in three groups of six and the 18 pistons include nine groups of two pistons where each of the nine groups include two corresponding diametrically opposing pistons which are separated by 180° to provide balance. With reference to the figure, the group to which a cylinder 18 belongs and the cylinders location about the circular cylinder block 16 are located directly above the cylinder. For example, cylinder 18-4 is a member of Group A and is located at 60°.

Similarly, the position of each lobe 46 of the camwheel 12 about the axis of rotation of the output shaft is indicated in degrees at times $t_1$, $t_2$, $t_3$, and $t_4$. The 12 lobes 46 are centered at 30° intervals. By way of example, at time $t_1$, the 12 lobes 46 are positioned at 0°, 30°, . . . , 300°, 330°. At time $t_1$, pistons 20-1, 20-4, 20-7, 20-10, 20-13, and 20-16 are aligned with the peaks of the lobes 46-1, 46-3, 46-5, 46-7, 46-9, and 46-11, which correspond to top dead center. The six pistons 20-1, 20-4, 20-7, 20-10, 20-13, and 20-16 fire, thereby pushing the pistons 20-1, 20-4, 20-7, 20-10, 20-13, and 20-16 downward on the guiderail to substantially simultaneously rotate the camwheel 12 about the axis of rotation of the output shaft 14, the direction in which the guiderail 50 is biased. The asterisks (*) above the lobes indicate a corresponding piston 20 firing which is a piston power stroke or a working stroke.

The force of the pistons of Group A on the guiderail advances the camwheel by approximately 10° to the position illustrated at time $t_2$, wherein the 12 lobes are positioned at 30° intervals at 10°, 40°, . . . , 310°, 340°. Here, the six pistons of Group C are aligned with the peaks of the lobes 46-46-2, 46-4, 46-6, 46-8, 46-10, and 46-12. The ignition and firing of the six pistons of Group C advances the camwheel by 10° to the position depicted at time $t_3$, wherein the 12 lobes are positioned at 30° intervals at 20°, 50°, . . . , 320°, 350°. Here, the six pistons of Group B, i.e., pistons 20-3, 20-6, 20-9, 20-12, 20-15, and 20-18, are aligned with the peaks of the lobes 46-1, 46-3, 46-5, 46-7, 46-9, and 46-11 when piston ignition occurs resulting in the advancement to the position depicted at time $t_4$. At this time, the pistons of Group A again align with the peaks of particular lobes and a new cylinder-enclosed piston firing cycle begins. In this instance, however, the pistons of Group A align with the peaks of lobes 46-12, 46-2, 46-4, 46-6, 46-8, and 46-10, respectively.

The firing of the cylinders in Groups A, B, and C may be accomplished through the use of a mechanical device, electronics, or a combination thereof. By way of example, the mechanical or electromechanical devices may include a timing wheel or secondary camwheel. It should be appreciated that in FIG. 10 the camwheel 12 is presented as rotating clockwise and the cylinders 18 fire in the order of Group A, Group C, Group B, etc. In FIG. 8, however, the camwheel 12 is presented as rotating counterclockwise and the cylinders 18 fire in a clockwise order of Group A, Group B, Group C, etc.

It should also be appreciated that although 18 cylinders and 12 lobes are presented, any number of cylinders and lobes may be utilized with the teachings of the present invention. An increased or decreased number of cylinders may be appropriate for particular applications as the number of cylinders increases, the number of such cylinders acting simultaneously on a firing or power stroke increases as well.

Figure 11:
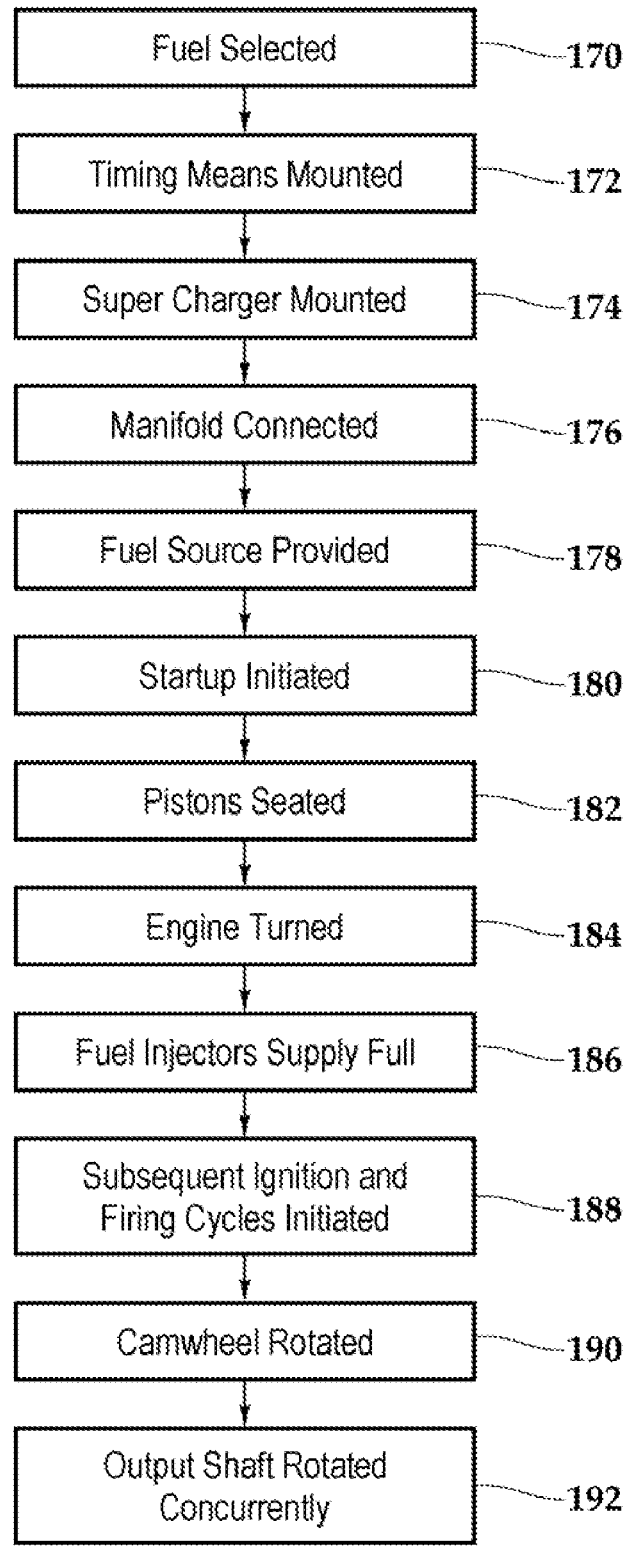
FIG. 11 is flow chart of one embodiment of a method for using the engine of FIG. 1.

FIG. 11 depicts a flow chart of one embodiment of a method for using the engine of FIG. 1. At block 170, a fuel type is selected. The engine presented herein may operate with a hydrocarbon fuel, pressurized air, steam or by hydrogen combustion. The hydrogen combustion option is a "cleantech" solution, of particular interest to the environment, having byproducts of water ($H_2O$) and nitrogen dioxide ($NO_2$). At block 172, a timing means is mounted to the engine for executing such functions as the ignition of the three groups, Groups A, B, and C. At block 174, a super charger, which is a conventional off-the-shelf device, is mounted to the engine. The supercharger may be utilized as an air compressor to force more air (and hence more oxygen) than is possible in ambient conditions into and through the chambers of the cylinders by way of the fluid flow passageways. A manifold is connected at block 176 and a fuel source is provided at block 178. Lubrication to the engine and its associated parts is provided where required by a conventional oil pump and passageways as will be apparent to those skilled in the art.

Engine startup occurs at block 180. Compressed air from an outside source such as a tank or small electric compressor enters the top of the cylinders through the port designated for air. The pressurized air seats the drive bearings of the pistons onto the guiderail of the camwheel at block 182. The engine is turned at block 184 by a starter motor which thereby causes fuel injectors to supply fuel at block 186 by way of the fuel source and the designated fuel port. Subsequent ignition and firing cycles are initiated at block 188 which result in the camwheel rotating at block 190. More specifically, as previously discussed, the camwheel is turned by the downward force of the pistons on the guiderail.

At block 192, the output shaft is rotated concurrently with the camwheel and the rotational movement is translated to a load. The engine produces power and torque continuously through each rotation of the camwheel at a steady speed for a variety of applications. By way of example, and not by of limitation, the engine is suitable for pumps, marine uses, power stations, large-scale hydraulics, cars, vehicles, as well as other commercial and industrial applications of varying scales.

In another embodiment of the methodology, a method for providing rotary motion to an output shaft is provided. The Group A pistons, which may be referred to as a first plurality of cylinder-enclosed pistons, are seated at top dead center positions of a camwheel of a static cylinder block. The camwheel being rotatably mounted to the output shaft for supplying rotary motion thereto. The Group B pistons, which may be referred to as a second plurality of cylinder-enclosed pistons, are seated between top dead center positions and bottom dead center positions of the camwheel. Lastly, the Group C pistons, or a third plurality of cylinder-enclosed pistons, are seated between bottom dead center positions and top dead center positions of the camwheel. The pistons are interleaved clockwise as Group A, Group B, Group C, etc.

In operation, the Group A pistons perform or cause a working stroke wherein combustion occurs within respective chambers of the cylinder-enclosed pistons. This forces the Group A pistons downward along a substantially sinusoidal surface biased for rotation in a direction of the rotary motion in order to provide rotary motion to the output shaft in a counterclockwise direction. Substantially simultaneously with the working stroke of the Group A pistons, an exhaust stroke occurs with the Group B pistons wherein combusted material is exhausted from the chambers of the Group B pistons. Also, substantially simultaneously with the working stroke, an intake stroke occurs with the Group C pistons wherein combustible material is disposed within the chambers of the Group C pistons. As the operation of the engine advances, the working stroke, exhaust stroke, and intake stroke are rotated between the first, second, and third pluralities of cylinder-enclosed pistons; i.e., the strokes are rotated between the Group A, Group B, and Group C cylinder-enclosed pistons.

The working stroke of the firing Group of cylinder-enclosed pistons forwards the camwheel into position for a subsequent working stroke. As previously discussed, in implementations wherein the camwheel is rotated clockwise, then the piston enclosed cylinders fire in the order of Group A, Group C, Group B, etc. Alternatively, should the camwheel rotate counterclockwise, then the piston enclosed-cylinders fire in the order of Group A, Group B, Group C, etc.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An engine having an output shaft for providing rotary motion, the engine comprising:
    first and second mounting plates;
    a camwheel rotatably mounted to the output shaft for supplying rotary motion thereto, the camwheel being disposed between the first and second mounting plates;
    a plurality of lobes integrally formed on the camwheel, the plurality of lobes defining a guiderail including a continuous surface;
    a plurality of cylinders straddling the guiderail, the plurality of cylinders being interposingly coupled between the first and second mounting plates in a static circular plane about the camwheel such that a radius of the circular plane and the camwheel are coplanar; and
    a corresponding plurality of pistons disposed within each of the plurality of cylinders, each of the corresponding plurality of pistons including a connecting shaft for coupling a drive bearing thereto, the drive bearing for engaging and maintaining contact with the guiderail,
    wherein the rotary motion is obtained by transferring displacement of the plurality of pistons from respective top dead center positions and bottom dead center positions to the guiderail, thereby rotating the camwheel.

2. The engine as recited in claim 1, wherein the plurality of lobes comprises 12 lobes.

3. The engine as recited in claim 1, wherein the plurality of cylinders straddling the guiderail comprises 18 cylinders having 18 pistons associated therewith.

4. The engine as recited in claim 3, wherein the 18 pistons fire in three groups of six.

5. The engine as recited in claim 3, wherein the 18 pistons further comprise nine groups of two pistons, each of the nine groups including two corresponding diametrically opposing pistons.

6. The engine as recited in claim 1, further comprising, for each of the plurality of cylinders, a fluid flow passageway traversing the first mounting plate, the respective cylinder, and the second mounting plate to provide for the collection of heat from an interior of the respective cylinder and the expulsion thereof.

7. The engine as recited in claim 1, further comprising first, second, and third ports disposed in a head of each of the plurality of cylinders and aligned substantially perpendicularly to the output shaft, the first, second, and third ports for respectively accepting pressurized air, a fuel injector, and an igniter.

8. The engine as recited in claim 1, wherein each of the plurality of cylinders is held in place by a plurality of fasteners extending through the first mounting plate, the respective cylinder, and the second mounting plate.

9. The engine as recited in claim 1, wherein each of the plurality of cylinders further comprises a substantially wedge shape body forming a skirt opposite to a head of the cylinder, the skirt for receiving the camwheel and extending about the camwheel in a line radial to an axis of rotation of the output shaft.

10. The engine as recited in claim 1, wherein each of the corresponding plurality of pistons further comprises a connecting shaft forming a U-shaped free end.

11. The engine as recited in claim 10, wherein each of the drive bearings spans the U-shaped free end while engaging and maintaining contact with the guiderail.

12. An engine having an output shaft for providing rotary motion, the engine comprising:
    first and second mounting plates;
    a camwheel rotatably mounted to the output shaft for supplying rotary motion thereto, the camwheel being disposed between the first and second mounting plates;
    a plurality of cylinders straddling the camwheel, the plurality of cylinders being interposingly coupled between the first and second mounting plates in a static circular plane about the camwheel such that a radius of the circular plane and the camwheel are coplanar; and
    a corresponding plurality of pistons disposed within each of the plurality of cylinders, each of the plurality of pistons including a connecting shaft for coupling a drive bearing thereto, the drive bearing for engaging and maintaining contact with the camwheel,
    wherein the rotary motion is obtained by transferring displacement from respective top dead center positions and bottom dead center positions to the camwheel, thereby rotating the camwheel.

13. The engine as recited in claim 12, wherein the plurality of pistons fire in three rotating groups of six equally spaced pistons.

14. The engine as recited in claim 13, wherein the six pistons that are firing are aligned with six of the twelve lobes.

15. A method for providing rotary motion from an engine to an output shaft, the method comprising:
seating a first plurality of cylinder-enclosed pistons at top dead center positions of a camwheel of a static cylinder block, the camwheel rotatably mounted to the output shaft for supplying rotary motion thereto;
seating a second plurality of cylinder-enclosed pistons between top dead center positions and bottom dead center positions of the camwheel;
seating a third plurality of cylinder-enclosed pistons between bottom dead center positions and top dead center positions of the camwheel such that the plurality of pistons are interleaved clockwise as a piston from the first plurality, a piston from the second plurality, and a piston from the third plurality;
causing a working stroke with the first plurality of cylinder-enclosed pistons wherein combustion occurs within respective chambers of the cylinder-enclosed pistons;
forcing the first plurality of cylinder-enclosed pistons downward along a continuous surface, thereby providing rotary motion to the output shaft in a counterclockwise direction;
substantially simultaneously with the working stroke, causing an exhaust stroke with the second plurality of cylinder-enclosed pistons wherein combusted material is exhausted from the second plurality of cylinder-enclosed pistons;
substantially simultaneously with the working stroke, causing an intake stroke with the third plurality of cylinder-enclosed pistons wherein combustible material is disposed within the third plurality of cylinder-enclosed pistons; and
rotating the working stroke, exhaust stroke, and intake stroke between the first, second, and third pluralities of cylinder-enclosed pistons.

16. The method as recited in claim 15, wherein causing a working stroke with the first plurality of cylinder-enclosed pistons further comprises hydrogen combustion.

17. The method as recited in claim 15, wherein the working stroke of the first plurality of cylinder-enclosed pistons forwards the camwheel into position for a subsequent working stroke.

18. A system for providing rotary motion to an output shaft, the system comprising:
means for seating a first plurality of cylinder-enclosed pistons at top dead center positions of a camwheel of a static cylinder block, the camwheel rotatably mounted to the output shaft for supplying rotary motion thereto;
means for seating a second plurality of cylinder-enclosed pistons between top dead center positions and bottom dead center positions of the camwheel;
means for seating a third plurality of cylinder-enclosed pistons between bottom dead center positions and top dead center positions of the camwheel such that the plurality of pistons are interleaved clockwise as a piston from the first plurality, a piston from the second plurality, and a piston from the third plurality;
means for causing a working stroke with the first plurality of cylinder-enclosed pistons wherein combustion occurs within respective chambers of the cylinder-enclosed pistons;
means for forcing the first plurality of cylinder-enclosed pistons downward along a continuous surface, thereby providing rotary motion to the output shaft in a counterclockwise direction;
substantially simultaneously with the working stroke, means for causing an exhaust stroke with the second plurality of cylinder-enclosed pistons wherein combusted material is exhausted from the second plurality of cylinder-enclosed pistons;
substantially simultaneously with the working stroke, means for causing an intake stroke with the third plurality of cylinder-enclosed pistons wherein combustible material is disposed within the third plurality of cylinder-enclosed pistons; and
means for rotating the working stroke, exhaust stroke, and intake stroke between the first, second, and third pluralities of cylinder-enclosed pistons.

19. The system as recited in claim 18, further comprising means for supplying hydrogen for hydrogen combustion to the first, second, and third pluralities of cylinder-enclosed pistons.

20. The system as recited in claim 18, the means for causing the working stroke of the first plurality of cylinder-enclosed pistons forwards the camwheel into position for a subsequent working stroke.

* * * * *